US009661489B2

(12) United States Patent
Xue

(10) Patent No.: US 9,661,489 B2
(45) Date of Patent: *May 23, 2017

(54) METHOD AND APPARATUS FOR CONTROLLING ISSUANCE OF PACKET DATA PROTOCOL CONTEXT

(71) Applicant: Huawei Technologies Co., Ltd., Shenzhen (CN)

(72) Inventor: Qingfeng Xue, Xi'an (CN)

(73) Assignee: Huawei Technology Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/134,137

(22) Filed: Apr. 20, 2016

(65) Prior Publication Data

US 2016/0234677 A1   Aug. 11, 2016

Related U.S. Application Data

(63) Continuation of application No. 14/307,010, filed on Jun. 17, 2014, now Pat. No. 9,369,913, which is a
(Continued)

(51) Int. Cl.
*H04W 80/04* (2009.01)
*H04W 8/04* (2009.01)
(Continued)

(52) U.S. Cl.
CPC ......... *H04W 8/04* (2013.01); *H04W 28/0226* (2013.01); *H04W 36/0033* (2013.01); *H04W 76/022* (2013.01); *H04W 60/00* (2013.01)

(58) Field of Classification Search
CPC ........... H04W 36/0033; H04W 76/022; H04W 80/04; H04W 36/18; H04W 72/04; H04W 28/0226
See application file for complete search history.

(56) References Cited

U.S. PATENT DOCUMENTS 6,104,929 A    8/2000  Josse et al.
6,643,511 B1   11/2003 Rune et al.
(Continued)

FOREIGN PATENT DOCUMENTS

CN         1595863 A      3/2005
CN         1849004 A      10/2006
WO    WO 2011085370 A2    7/2011

OTHER PUBLICATIONS

Partial English Translation and Abstract of Chinese Patent Application No. CN1849004A, Jul. 1, 2014, 6 pages.
(Continued)

*Primary Examiner* — Andrew Lee
(74) *Attorney, Agent, or Firm* — Leydig, Voit & Mayer, Ltd.

(57) ABSTRACT

A method and an apparatus for controlling issuance of a PDP context. The method includes: receiving a GPRS location updating request of a user sent by an SGSN; acquiring, according to the GPRS location updating request, an issuance control condition of a PDP context to which the user has subscribed; and determining, according to the issuance control condition, whether to send the PDP context to the SGSN. According to the method and the apparatus for controlling issuance of a PDP context in the embodiments of the present disclosure, issuance of a PDP context is controlled based on an issuance control condition of the PDP context, which can avoid generation of unnecessary traffic, improve service experience of a user, and reduce the customer service workload of an operator, thereby lowering the operating cost of the operator.

8 Claims, 5 Drawing Sheets

Related U.S. Application Data continuation of application No. PCT/CN2011/084232, filed on Dec. 19, 2011.

(51) Int. Cl.
*H04W 76/02* (2009.01)
*H04W 28/02* (2009.01)
*H04W 36/00* (2009.01)
*H04W 60/00* (2009.01)

(56) References Cited

U.S. PATENT DOCUMENTS

| | | |
|---|---|---|
| 7,042,855 B1 | 5/2006 | Gilchrist et al. |
| 2004/0233893 A1 | 11/2004 | Zhou et al. |
| 2005/0157673 A1 | 7/2005 | Verma et al. |
| 2006/0281492 A1 | 12/2006 | Jiang |
| 2008/0125116 A1 | 5/2008 | Jiang |
| 2009/0034496 A1 | 2/2009 | Ko et al. |
| 2010/0214924 A1 | 8/2010 | Sendra Alcina et al. |
| 2011/0199963 A1 | 8/2011 | Shaw |
| 2012/0079082 A1 | 3/2012 | Ding et al. |
| 2012/0163297 A1 | 6/2012 | Agarwal et al. |
| 2013/0329653 A1 | 12/2013 | Russell et al. |
| 2014/0349641 A1 | 11/2014 | Jiang et al. |

OTHER PUBLICATIONS

Foreign Communication From a Counterpart Application, PCT Application No. PCT/CN2011/084232, English Translation of International Search Report dated Sep. 27, 2012, 2 pages.
Foreign Communication From a Counterpart Application, PCT Application No. PCT/CN2011/084232, English Translation of Written Opinion dated Sep. 27, 2012, 8 pages.

METHOD AND APPARATUS FOR CONTROLLING ISSUANCE OF PACKET DATA PROTOCOL CONTEXT

CROSS-REFERENCE TO RELATED APPLICATIONS

This application is a continuation of U.S. patent application Ser. No. 14/307,010, filed Jun. 17, 2014, which is a continuation of International Patent Application No. PCT/CN2011/084232, filed on Dec. 19, 2011. The afore-mentioned patent applications are hereby incorporated by reference in their entireties.

TECHNICAL FIELD

The present invention relates to the communications field, and in particular, to a method and an apparatus for controlling issuance of a packet data protocol context.

BACKGROUND

On a current mobile network, a user subscribes to a general packet radio service (GPRS) packet data protocol (PDP) context on a home location register (HLR) so as to acquire a corresponding GPRS service application. In addition, according to current stipulation in a Third Generation Partnership Project (3GPP) protocol, the HLR needs to issue all GPRS PDP contexts to which the user has subscribed to all access networks of the user. However, the GPRS service application needs to rely on a corresponding bandwidth resource, and application experience of the service is relatively poor when the relevant bandwidth resource cannot be ensured, resulting in that the user cannot obtain normal service experience although the user has used corresponding traffic; or if the user finds in a visited location that some GPRS services do not need to be used or cannot be used normally, the user requests customer service personnel of an operator to cancel the GPRS service, so as to avoid generation of unnecessary traffic, which, however, increases the customer service workload of the operator and therefore increases the operating cost of the operator.

Therefore, an appropriate technical solution is needed to control issuance of a PDP context so as to avoid generation of unnecessary traffic and improve the service experience of the user.

SUMMARY

Embodiments of the present invention provide a method and an apparatus for controlling issuance of a PDP context, which can avoid generation of unnecessary traffic and improve service experience of a user.

In one aspect, a method for controlling issuance of a PDP context is provided. The method includes: receiving a GPRS location updating request of a user sent by a serving GPRS support node (SGSN); acquiring, according to the GPRS location updating request, an issuance control condition of a PDP context to which the user has subscribed; and determining, according to the issuance control condition, whether to send the PDP context to the SGSN.

In another aspect, an apparatus for controlling issuance of a PDP context is provided. The apparatus includes: a receiving module configured to receive a GPRS location updating request of a user sent by an SGSN; an acquiring module configured to acquire, according to the GPRS location updating request received by the receiving module, an issuance control condition of a PDP context to which the user has subscribed; and a first determining module configured to determine, according to the issuance control condition acquired by the acquiring module, whether to send the PDP context to the SGSN.

Based on the foregoing technical solutions, according to the method and the apparatus for controlling issuance of a PDP context in the embodiments of the present invention, issuance of a PDP context is controlled based on an issuance control condition of the PDP context, which can avoid generation of unnecessary traffic, improve service experience of a user, and reduce the customer service workload of an operator, thereby lowering the operating cost of the operator.

BRIEF DESCRIPTION OF DRAWINGS

To illustrate the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

It should be understood that the technical solutions in the embodiments of the present invention may be applied to various communications systems, such as a global system for mobile communications (GSM) system, a code division multiple access (CDMA) system, a wideband CDMA (WCDMA) system, a general packet radio service (GPRS) system, a long term evolution (LTE) system, an LTE frequency division duplex (FDD) system, an LTE time division duplex (TDD) system, and a universal mobile telecommunications system (UMTS).

A user, also referred to as a user equipment (UE), a mobile terminal, a mobile user equipment, or the like, may communicate with one or more core networks through a radio access network (RAN). The user may be a mobile terminal, such as a mobile phone (or referred to as a cellular phone) or a computer equipped with a mobile terminal. For example, the mobile terminal may be a portable, pocket-type, handheld, computer-embedded, or vehicle-mounted mobile apparatus, which exchanges a language and/or data with the radio access network.

Figure 1:
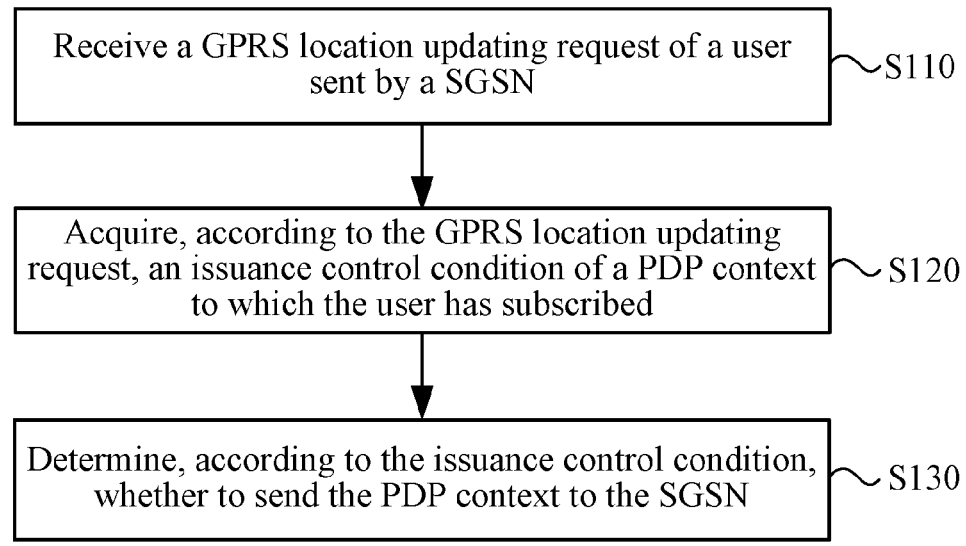
FIG. 1 is a schematic flowchart of a method for controlling issuance of a PDP context according to an embodiment of the present invention.

FIG. 1 shows a schematic flowchart of a method 100 for controlling issuance of a PDP context according to an embodiment of the present invention. As shown in FIG. 1, the method 100 includes:

S110. Receive a GPRS location updating request of a user sent by an SGSN.

S120. Acquire, according to the GPRS location updating request, an issuance control condition of a PDP context to which the user has subscribed.

S130. Determine, according to the issuance control condition, whether to send the PDP context to the SGSN.

After receiving the GPRS location updating request of the user sent by the SGSN, an apparatus for controlling issuance of a PDP context may acquire, according to the GPRS location updating request, the issuance control condition of the PDP context to which the user has subscribed, and determine, according to the issuance control condition, whether to send the PDP context to the SGSN.

Therefore, according to the method for controlling issuance of a PDP context in this embodiment of the present invention, issuance of a PDP context is controlled based on an issuance control condition of the PDP context, which can avoid generation of unnecessary traffic, improve service experience of a user, and reduce the customer service workload of an operator, thereby lowering the operating cost of the operator.

It should be understood that in this embodiment of the present invention, the PDP context to which the user has subscribed may be one or one type of PDP contexts among all PDP contexts to which the user has subscribed, or a part or all of the PDP contexts to which the user has subscribed, depending on a specific situation, and is not limited in this embodiment of the present invention.

It should be further understood that in this embodiment of the present invention, an issuance control condition may be configured based on a specific PDP context of a specific user. For example, an issuance control condition may be configured for each PDP context of each user. For example, an issuance control condition used to indicate a network range of issuance may be configured for each PDP context of each user. In this embodiment of the present invention, the issuance control condition may also not be configured on the basis of a specific PDP context. For example, PDP contexts supported by each network may be configured on a network basis. Therefore, in this embodiment of the present invention, any condition capable of controlling the issuance of the PDP context may be referred to as the issuance control condition of the PDP context.

In this embodiment of the present invention, the issuance control condition may be manually configured. For example, an issuance control condition used to indicate a network range of issuance of the PDP context may be manually configured according to a network requirement of the user for a GPRS service that corresponds to a certain PDP context and/or according to a wireless bandwidth provided by each network for the GPRS service. In this embodiment of the present invention, the issuance control condition may also be automatically set by the apparatus for controlling issuance of a PDP context. For example, when users who use a GPRS service that corresponds to a certain PDP context on a network are saturated, an issuance control condition may be automatically set, which is used to indicate that issuing the PDP context to an SGSN on the network needs to be suspended, and the issuance control condition is not canceled until the number of users who use the GPRS service that corresponds to the PDP context on the network is less than a saturation value.

In this embodiment of the present invention, the apparatus for controlling issuance of a PDP context may directly determine, according to the issuance control condition, whether to send the PDP context to which the user has subscribed to the SGSN. For example, when the operator needs to suspend or cancel a certain GPRS service, an issuance control condition used to indicate that a PDP context that corresponds to the GPRS service does not need to be issued to any network may be manually configured; and after receiving a GPRS location updating request of a user who has subscribed to the PDP context that corresponds to the GPRS service, the apparatus for controlling issuance of a PDP context may directly determine, according to the issuance control condition, that the PDP context that corresponds to the GPRS service does not need to be sent to the SGSN. The apparatus for controlling issuance of a PDP context may also determine, according to the issuance control condition and in combination with another parameter, whether to send the PDP context to which the user has subscribed to the SGSN. For example, when the issuance control condition indicates a network range of issuance of the PDP context to which the user has subscribed or indicates a time range of the issuance, the apparatus for controlling issuance of a PDP context may determine, according to the issuance control condition and in combination with a network the user currently accesses or time of current access of the user, whether to send the PDP context to the SGSN.

Figure 2:
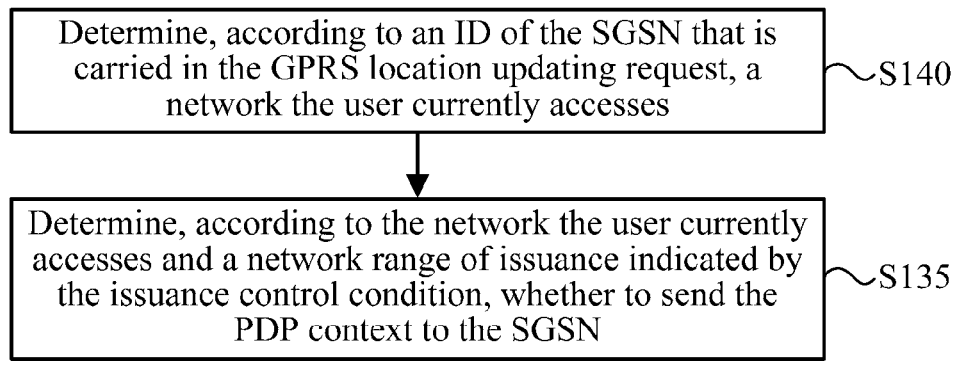
FIG. 2 is a schematic flowchart of a method for controlling issuance of a PDP context according to another embodiment of the present invention.

In this embodiment of the present invention, when the issuance control condition indicates the network range of issuance of the PDP context, as shown in FIG. 2, the method 100 may further include:

S140. Determine, according to an identity (ID) of the SGSN that is carried in the GPRS location updating request, a network the user currently accesses.

The determining whether to send the PDP context to the SGSN in step S130 includes:

S135. Determine, according to the network the user currently accesses and the network range of issuance indicated by the issuance control condition, whether to send the PDP context to the SGSN; and when the network the user currently accesses belongs to the network range of issuance, determine that the PDP context needs to be sent to the SGSN; or when the network the user currently accesses does not belong to the network range of issuance, determine that the PDP context does not need to be sent to the SGSN.

It should be understood that in this embodiment of the present invention, the network the user currently accesses may also be determined according to other information carried in the GPRS location updating request, which is not limited in this embodiment of the present invention.

In this embodiment of the present invention, the network range of issuance may be manually configured when the user subscribes to the PDP context. For example, the network range of issuance of the PDP context is manually configured according to a requirement of the user and/or a network bandwidth situation of manual statistics. For example, when the user needs to use a GPRS service that corresponds to the PDP context inside a local country only, the issuance control condition of the PDP context is set to issuance inside the local country. For another example, when the user needs to use the GPRS service inside the local country but a relevant bandwidth resource of a national home public land mobile network (PLMN) does not support the GPRS service, the issuance control condition of the PDP context is set to issuance on other national PLMNs.

In this embodiment of the present invention, a control option of the issuance control condition used to indicate the network range of issuance may be at least one of the following: no issuance on any network, issuance on other international PLMNs only, issuance on international home PLMNs only, issuance during international roaming only, issuance on other national PLMNs only, issuance on other PLMNs only, issuance on other national PLMNs and international home PLMNs only, issuance on all PLMNs except national home PLMNs, issuance on national home PLMNs only, issuance on national home PLMNs and other international PLMNs only, issuance on home PLMNs only, issuance on all PLMNs except other national PLMNs, issuance inside the local country only, issuance on all PLMNs except international home PLMNs, issuance on all PLMNs except other international PLMNs, and issuance on all PLMNs; and correspondingly, the network the user currently accesses may be a national home PLMN, another national PLMN, an international home PLMN, or another international PLMN.

It should be understood that not only the network range of issuance may be divided according to National, International, Home PLMNs, and Other PLMNs, but also International and Other PLMNs may be segmented. For example, assuming that the home PLMNs are networks of China Mobile, the other PLMNs may be segmented into networks of China Telecom and China Unicom. For another example again, assuming that National is China, International may be segmented into the United States, Japan, Great Britain, and the like, depending on a specific situation, and is not limited in this embodiment of the present invention.

Figure 3:
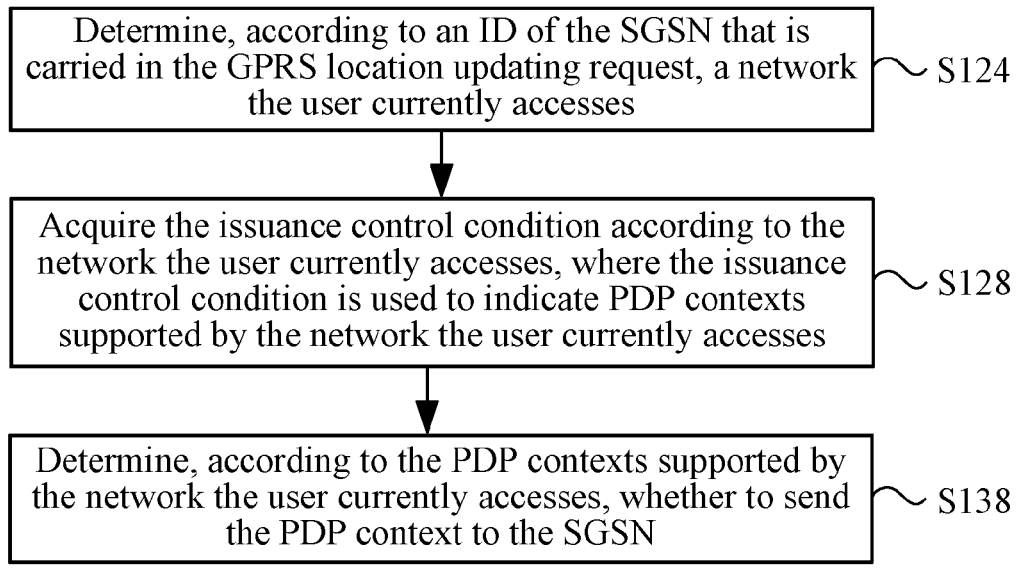
FIG. 3 is a schematic flowchart of a method for controlling issuance of a PDP context according to still another embodiment of the present invention.

In this embodiment of the present invention, as shown in FIG. 3, in S120 of the method 100, the acquiring an issuance control condition of a PDP context to which the user has subscribed may further include:

S124. Determine, according to an ID of the SGSN that is carried in the GPRS location updating request, a network the user currently accesses.

S128. Acquire the issuance control condition according to the network the user currently accesses, where the issuance control condition is used to indicate PDP contexts supported by the network the user currently accesses.

The determining whether to send the PDP context to the SGSN in step S130 may further include:

S138. Determine, according to the PDP contexts supported by the network the user currently accesses, whether to send the PDP context to the SGSN.

When the PDP context belongs to the PDP contexts supported by the network the user currently accesses, it may be determined that the PDP context needs to be sent to the SGSN; or when the PDP context does not belong to the PDP contexts supported by the network the user currently accesses, it may be determined that the PDP context does not need to be sent to the SGSN.

In this embodiment of the present invention, the PDP contexts supported by the network the user currently accesses may be determined according to a type, a name, or the like of the PDP contexts supported by the network the user currently accesses, or according to other information, which is not limited in this embodiment of the present invention.

It should be understood that in this embodiment of the present invention, the PDP contexts supported by each network may be manually configured. For example, the PDP contexts supported by each network may be manually configured according to a bandwidth requirement of a GPRS service that corresponds to each PDP context and according to a bandwidth each network can provide for the GPRS service that corresponds to each PDP context. In this embodiment of the present invention, the apparatus for controlling issuance of a PDP context may also automatically configure and update at any time the PDP contexts supported by each network according to the detected bandwidth requirement of the GPRS service that corresponds to each PDP context and according to a bandwidth each network provides for the GPRS service that corresponds to each PDP context.

In this embodiment of the present invention, an issuance rule may be set if an issuance control condition of a certain PDP context includes two or more conditions. For example, it may be set to issuing the PDP context only when all the conditions are met, or issuing the PDP context as long as one of the conditions is met; or priorities are set for all the conditions, and the PDP context needs to be issued only when a condition of a high priority is met. For example, when the issuance control condition indicates the network range of issuance of the PDP context and the PDP contexts supported by the network the user currently accesses, whether to issue the PDP context may be determined according to the set issuance rule. For example, when the issuance rule is used to indicate that the PDP context is determined for issuance only when all the conditions are met, it is determined that the PDP context needs to be sent to the SGSN only when the network the user currently accesses belongs to the network range of issuance of the PDP context and when the PDP context belongs to the PDP contexts supported by the network the user currently accesses; or when the issuance rule is used to indicate that the PDP context can be issued as long as one of the conditions is met, it may be determined that the PDP context needs to be sent to the SGSN as long as the network the user currently accesses belongs to the network range of issuance of the PDP context or the PDP context belongs to the PDP contexts supported by the network the user currently accesses; or priorities are set for the two, and it is determined that the PDP context needs to be issued only when a condition of a high priority is met. For example, when the PDP contexts supported by the network the user currently accesses have relatively high priorities, it is determined that the PDP context needs to be issued only when the PDP context belongs to the PDP contexts supported by the network the user currently accesses.

It should be understood that in this embodiment of the present invention, the issuance control condition may further be used to indicate other information, such as a bandwidth requirement of the GPRS service that corresponds to the PDP context to which the user has subscribed, and then the apparatus for controlling issuance of a PDP context may determine, according to whether a bandwidth provided by the network the user currently accesses for the GPRS service that corresponds to the PDP context meets the bandwidth requirement of the GPRS service, whether to send the PDP context to the SGSN. Information of the bandwidth requirement of the GPRS service that corresponds to the PDP context and information of the bandwidth provided by the network for the GPRS service that corresponds to the PDP context may be manually configured; and information of a bandwidth requirement of each GPRS service and information of a bandwidth provided by each network for each GPRS service may also be automatically set and updated at any time.

In this embodiment of the present invention, after a PDP context to be issued among all PDP contexts to which the user has subscribed is determined, the determined PDP context to be issued may be sent to the SGSN; or when it is determined that no PDP context to which the user has subscribed needs to be sent to the SGSN, a GPRS not subscribed error response is sent to the SGSN.

In this embodiment of the present invention, the apparatus for controlling issuance of a PDP context may be an HLR or another apparatus. For ease of understanding, the following describes in detail a method for controlling issuance of a PDP context according to an embodiment of the present invention with reference to FIG. 2 and by using the HLR as an example.

In this embodiment of the present invention, the GPRS service that corresponds to the PDP context may be a high performance push to talk service (HPPTT), a wireless application protocol (WAP) service, or another service. For ease of understanding, the following description uses the HPPTT service and the WAP service as an example.

Figure 4:
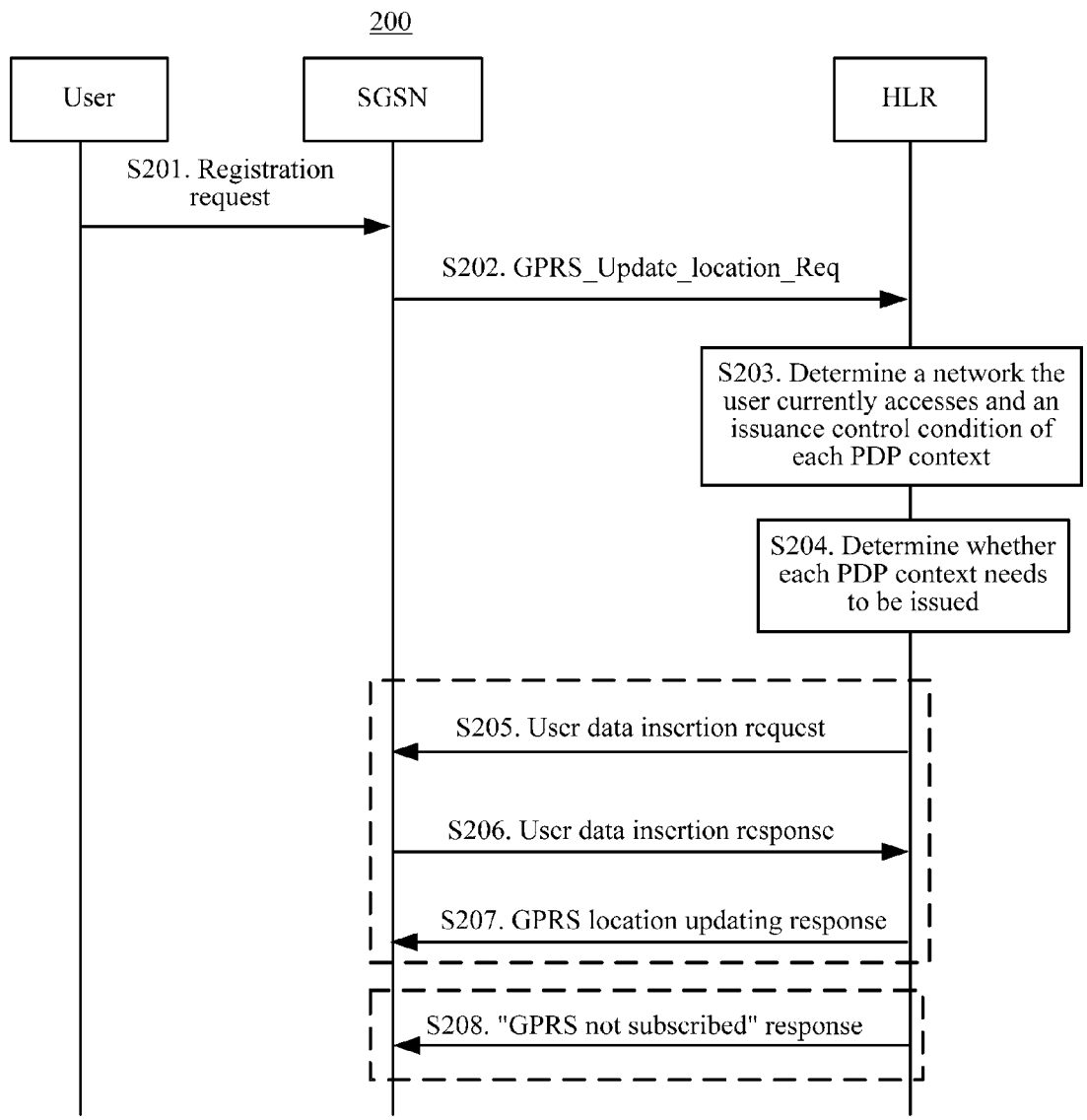
FIG. 4 is a schematic flowchart of a method for controlling issuance of a PDP context according to still another embodiment of the present invention.

FIG. 4 is a schematic flowchart of a method 200 for controlling issuance of a PDP context according to an embodiment of the present invention. As shown in FIG. 4, the method 200 includes:

S201. A user sends a registration request to an SGSN during network switching.

S202. After receiving the registration request sent by the user, the SGSN sends a GPRS location updating request (GPRS_Update_location_Req) to an HLR.

The GPRS_Update_location_Req carries information of the user and an ID of the SGSN.

S203. After receiving the GPRS_Update_location_Req sent by the SGSN, the HLR determines a network the user currently accesses and an issuance control condition of each PDP context.

Specifically, the HLR determines, according to the ID of the SGSN, the network the user currently accesses, and acquires, according to the information of the user, the issuance control condition of each PDP context to which the user has subscribed, where the issuance control condition of each PDP context is stored on the HLR. For example, it is determined according to the ID of the SGSN that the network the user currently accesses is another national PLMN, a network range of issuance of a PDP context that corresponds to the HPPTT service is National, a network range of issuance of a PDP context that corresponds to the WAP service is Home PLMNs, and PDP contexts supported by other national PLMNs include the PDP contexts that correspond to the HPPTT service and the WAP service.

S204. The HLR determines, respectively according to the network the user currently accesses and the issuance control condition of each PDP context to which the user has subscribed, whether each PDP context needs to be issued.

For example, for the HPPTT service, if the network range of issuance of the PDP context to which the HPPTT service corresponds is National, the network the user currently accesses is another national PLMN within the network range of issuance, and the PDP context belongs to the PDP contexts supported by the other national PLMNs, it may be determined that the PDP context needs to be sent to the SGSN; and for the WAP service, if the network range of issuance of the PDP context that corresponds to the WAP service is Home PLMNs and the network the user currently accesses is another national PLMN outside the network range of issuance, it is determined that the PDP context that corresponds to the WAP service does not need to be sent to the SGSN.

When the HLR determines in S204 that a PDP context needs to be issued, S205, S206, and S207 are executed; or when the HLR determines in S205 that no PDP context to which the user has subscribed needs to be sent, S208 is executed.

S205. When it is determined that a PDP context to which the user has subscribed needs to be sent to the SGSN, the HLR sends a user data insertion request (Insert_Subscriber_Date_Req) to the SGSN according to the determined PDP context to be issued, so as to send the determined PDP context to be issued to the SGSN. For example, the PDP context that corresponds to the HPPTT service is sent to the SGSN.

S206. The HLR receives a user data insertion response (Insert_Subscriber_Date_Rsp), where the user data insertion response is sent by the SGSN according to the Insert_Subscriber_Date_Req.

S207. The HLR updates location information of the user, and sends a GPRS location updating response (GPRS_Update_location_Rsp) to the SGSN.

S208. When it is determined that no PDP context to which the user has subscribed needs to be sent, the HLR sends a GPRS not subscribed error response to the SGSN.

It should be understood that in various embodiments of the present invention, the sequence numbers of the foregoing processes do not imply any execution sequence. The execution sequence of the processes should be determined according to functions and internal logic of the processes, and should not be construed as any limitation to the implementation processes of the embodiments of the present invention.

Therefore, according to the method for controlling issuance of a PDP context in this embodiment of the present invention, issuance of a PDP context is controlled based on an issuance control condition of the PDP context, which can avoid generation of unnecessary traffic, improve service experience of a user, and reduce the customer service workload of an operator, thereby lowering the operating cost of the operator.

The foregoing description is a detailed description of the method for controlling issuance of a PDP context according to an embodiment of the present invention with reference to FIG. 1 to FIG. 4. The following describes an apparatus for controlling issuance of a PDP context according to an embodiment of the present invention with reference to FIG. 5 to FIG. 7.

Figure 5:
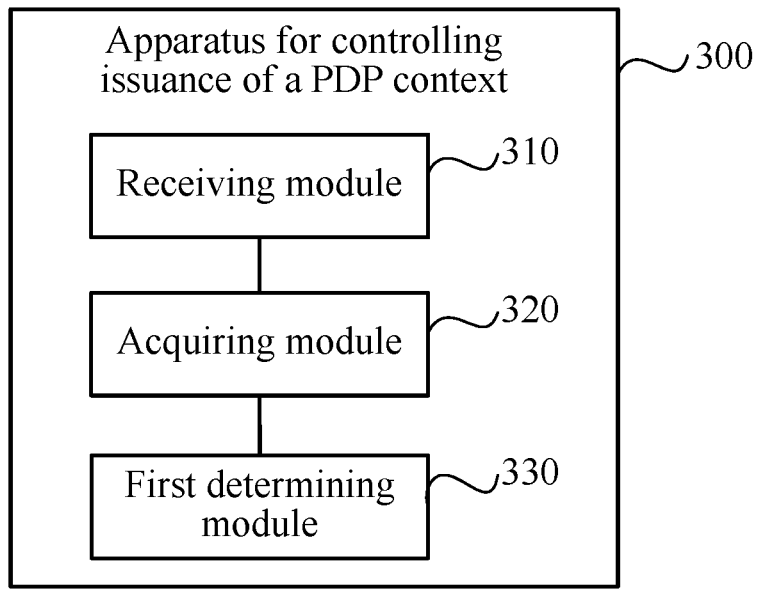
FIG. 5 is a schematic block diagram of an apparatus for controlling issuance of a PDP context according to an embodiment of the present invention.

FIG. 5 is a schematic block diagram of an apparatus 300 for controlling issuance of a PDP context according to an embodiment of the present invention. As shown in FIG. 5, the apparatus 300 includes:

a receiving module 310 configured to receive a GPRS location updating request of a user sent by an SGSN;

an acquiring module 320 configured to acquire, according to the GPRS location updating request received by the receiving module 310, an issuance control condition of a PDP context to which the user has subscribed; and a first determining module 330 configured to determine, according to the issuance control condition acquired by the acquiring module 320, whether to send the PDP context to the SGSN.

Therefore, according to the apparatus for controlling issuance of a PDP context in this embodiment of the present invention, issuance of a PDP context is controlled based on an issuance control condition of the PDP context, which can avoid generation of unnecessary traffic, improve service experience of a user, and reduce the customer service workload of an operator, thereby lowering the operating cost of the operator.

Figure 6:
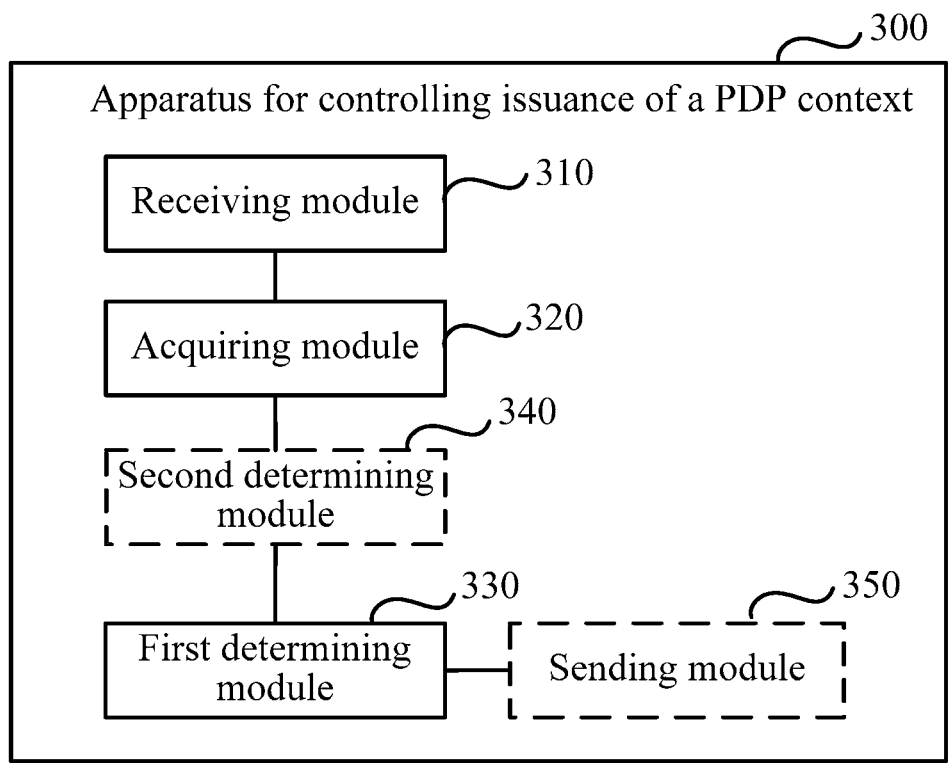
FIG. 6 is a schematic block diagram of an apparatus for controlling issuance of a PDP context according to another embodiment of the present invention.

Optionally, as shown in FIG. 6, in addition to the receiving module 310, the acquiring module 320, and the first determining module 330, the apparatus 300 further includes a second determining module 340, configured to determine, according to an ID of the SGSN that is carried in the GPRS location updating request received by the receiving module 310, a network the user currently accesses; and correspondingly, the first determining module 330 is configured to determine, according to the network the user currently accesses that is determined by the second determining module 340 and according to a network range of issuance that is indicated by the issuance control condition acquired by the acquiring module 320, whether to send the PDP context to the SGSN.

Figure 7:
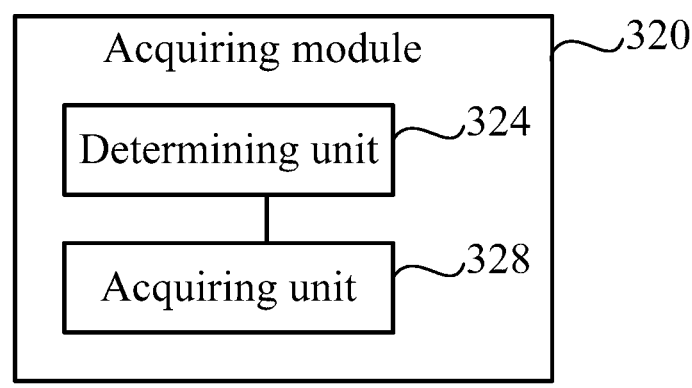
FIG. 7 is a schematic block diagram of an acquiring module according to an embodiment of the present invention.

Optionally, as shown in FIG. 7, the acquiring module 320 includes:

a determining unit 324 configured to determine, according to the ID of the SGSN that is carried in the GPRS location updating request received by the receiving module 310, the network the user currently accesses; and an acquiring unit 328 configured to acquire the issuance control condition according to the network the user currently accesses that is determined by the determining unit 324, where the issuance control condition is used to indicate PDP contexts supported by the network the user currently accesses; and correspondingly, the first determining module 330 is configured to:

determine, according to the PDP contexts that are supported by the network the user currently accesses and indicated by the issuance control condition acquired by the acquiring module 320, whether to send the PDP context to the SGSN.

Optionally, the network the user currently accesses is a national home PLMN, another national PLMN, an international home PLMN, or another international PLMN.

Optionally, a control option of the issuance control condition is at least one of the following: issuance on other international PLMNs only, issuance on international home PLMNs only, issuance during international roaming only, issuance on other national PLMNs only, issuance on other PLMNs only, issuance on other national PLMNs and international home PLMNs only, issuance on all PLMNs except national home PLMNs, issuance on national home PLMNs only, issuance on national home PLMNs and other international PLMNs only, issuance on home PLMNs only, issuance on all PLMNs except other national PLMNs, issuance inside a local country only, issuance on all PLMNs except international home PLMNs, and issuance on all PLMNs except other international PLMNs.

Optionally, as shown in FIG. 6, the apparatus 300 further includes a sending module 350, configured to send a GPRS not subscribed error response to the SGSN when the first determining module 330 determines that no PDP context to which the user has subscribed needs to be sent to the SGSN.

Optionally, the apparatus 300 includes an HLR.

Therefore, according to the apparatus for controlling issuance of a PDP context in this embodiment of the present invention, issuance of a PDP context is controlled based on an issuance control condition of the PDP context, which can avoid generation of unnecessary traffic, improve service experience of a user, and reduce the customer service workload of an operator, thereby lowering the operating cost of the operator.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, a detailed working process of the foregoing system, apparatus, and unit may refer to the corresponding process in the foregoing method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program codes, such as a universal serial bus (USB) flash disk, a removable hard disk, a read-only memory (ROM), a random access memory (RAM), a magnetic disk, or an optical disk.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for controlling issuance of a packet data protocol (PDP) context, comprising:
   receiving a general packet radio service (GPRS) location updating request of a user sent by a serving general packet radio service support node (SGSN); wherein the location updating request carries information of the user and an identity (ID) of the SGSN;
   determining, according to the ID of the SGSN, a network the user currently accesses;
   acquiring, according to the information of the user, an issuance control condition of a PDP context to which the user has subscribed; and
   determining, according to the network the user currently accesses and a network range of issuance indicated by the issuance control condition, whether to send the PDP context to the SGSN.

2. The method according to claim 1, wherein the network the user currently accesses is a national home public land mobile network (PLMN), another national PLMN, an international home PLMN, or another international PLMN.

3. The method according to claim 1, wherein a control option of the issuance control condition is one selected from the group consisting of: issuance on other international public land mobile networks (PLMNs) only, issuance on international home PLMNs only, issuance during international roaming only, issuance on other national PLMNs only, issuance on other PLMNs only, issuance on other national PLMNs and international home PLMNs only, issuance on all PLMNs except national home PLMNs, issuance on national home PLMNs only, issuance on national home PLMNs and other international PLMNs only, issuance on home PLMNs only, issuance on all PLMNs except other national PLMNs, issuance inside a local country only, issuance on all PLMNs except international home PLMNs, and issuance on all PLMNs except other international PLMNs.

4. The method according to claim 1, wherein the method further comprises sending a GPRS not subscribed error response to the SGSN when it is determined that no PDP context to which the user has subscribed needs to be sent.

5. An apparatus for controlling issuance of a packet data protocol (PDP) context, comprising a processor; and a non-transitory computer readable medium having a plurality of computer readable instructions stored thereon that, when executed by the processor, cause the processor to:
   receive a general packet radio service (GPRS) location updating request of a user sent by a serving general packet radio service support node (SGSN); wherein the location updating request carries information of the user and an identity (ID) of the SGSN;
   determine, according to the ID of the SGSN, a network the user currently accesses;
   acquire, according to the information of the user, an issuance control condition of a PDP context to which the user has subscribed; and
   determine, according to the network the user currently accesses and a network range of issuance indicated by the issuance control condition, whether to send the PDP context to the SGSN.

6. The apparatus according to claim 5, wherein the network the user currently accesses is a national home public land mobile network (PLMN), another national PLMN, an international home PLMN, or another international PLMN.

7. The apparatus according to claim 5, wherein a control option of the issuance control condition is one selected from the group consisting of: issuance on other international public land mobile networks (PLMNs) only, issuance on international home PLMNs only, issuance during international roaming only, issuance on other national PLMNs only, issuance on other PLMNs only, issuance on other national PLMNs and international home PLMNs only, issuance on all PLMNs except national home PLMNs, issuance on national home PLMNs only, issuance on national home PLMNs and other international PLMNs only, issuance on home PLMNs only, issuance on all PLMNs except other national PLMNs, issuance inside a local country only, issuance on all PLMNs except international home PLMNs, and issuance on all PLMNs except other international PLMNs.

8. The apparatus according to claim 5, wherein the apparatus comprises a home location register (HLR).

* * * * *